No. 796,539. PATENTED AUG. 8, 1905.
E. W. STEVENS.
NUT LOCK.
APPLICATION FILED OCT. 5, 1904.

Witnesses
Howard D. Orr
B. G. Foster

Edwin W. Stevens, Inventor,
By E. G. Siggers
Attorney

UNITED STATES PATENT OFFICE.

EDWIN WALLACE STEVENS, OF LAKE CAREY, PENNSYLVANIA.

NUT-LOCK.

No. 796,539.     Specification of Letters Patent.     Patented Aug. 8, 1905.

Application filed October 5, 1904. Serial No. 227,238.

*To all whom it may concern:*

Be it known that I, EDWIN WALLACE STEVENS, a citizen of the United States, residing at Lake Carey, in the county of Wyoming and State of Pennsylvania, have invented a new and useful Nut-Lock, of which the following is a specification.

This invention relates to improvements in that type of lock wherein a plurality of nuts are placed upon a shank having differently-threaded portions, said nuts being locked against relative movement.

The object in the present case is to provide a novel structure of the sort wherein the nuts are securely held against relative movement by a simple locking device that can be readily applied and is itself fastened against detachment when in position. However, the said nuts can be unlocked and taken off, if desired, without in any way injuring the same or the shank upon which they are placed.

The preferred form of construction is illustrated in the accompanying drawings, wherein—

Figure 1:
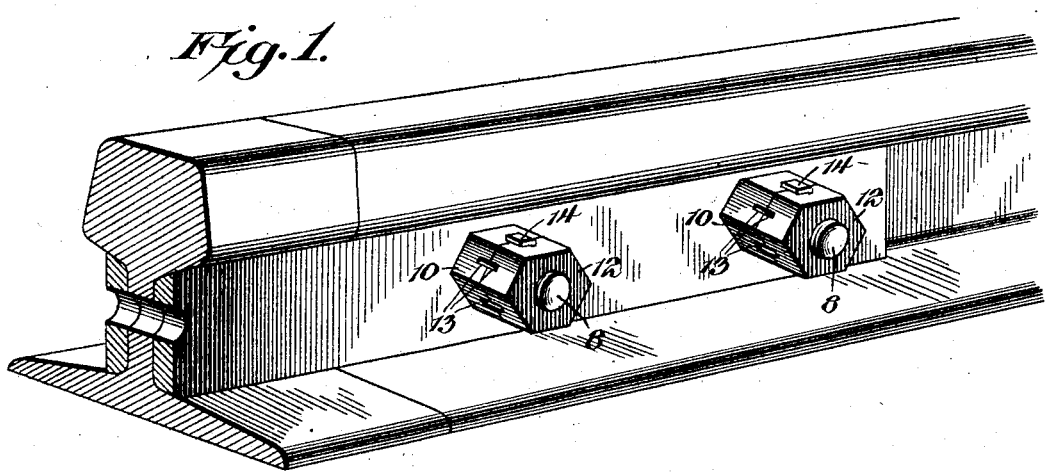
Figure 2:
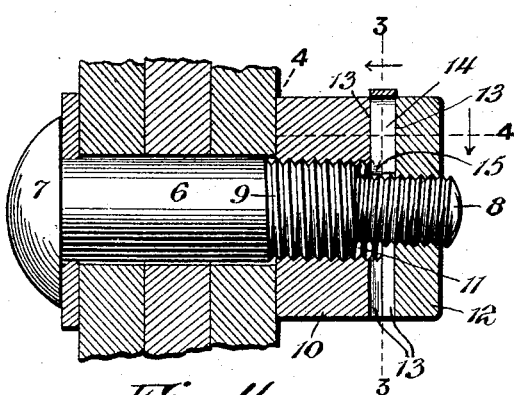
Figure 3:
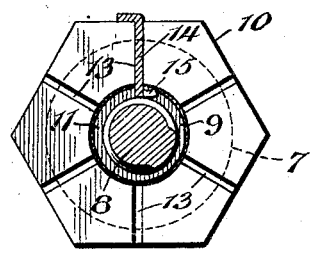
Figure 4:
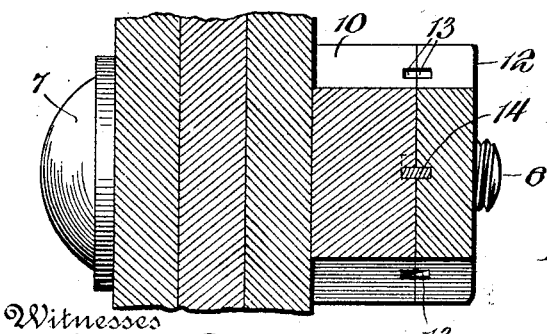
Figure 5:
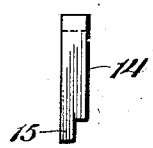

Figure 1 is a perspective view of a portion of a rail-joint, showing the improved lock. Fig. 2 is a sectional view therethrough. Fig. 3 is a sectional view taken on the line 3 3 of Fig. 2. Fig. 4 is a detail sectional view on the line 4 4 of Fig. 2. Fig. 5 is a detail view of the locking device.

Similar reference-numerals designate corresponding parts in all the figures of the drawings.

In the embodiment of the invention illustrated a bolt is employed comprising a shank 6, having at one end a head 7, said shank being provided with a reduced portion at its other end in the form of a stem 8. The stem 8 is threaded in one direction, while the portion directly adjacent thereto is threaded in an opposite direction, as shown in Fig. 2, and is designated 9.

A nut 10 is screwed upon the threaded portion 9 and projects beyond the outer end of the stem, overlying the reduced portion 8 and being spaced therefrom to leave a recess 11. Another nut 12 is threaded on said reduced portion and is preferably of such a size that its outer faces will aline with those of the nut 10. The nuts are provided in their adjacent ends with radially-disposed slots 13, which are adapted to be placed in alinement, the lines of direction of said slots intersecting the reduced portion 8 of the shank. It will thus be apparent by reference to Fig. 2 that the slots in the outer nut 12 extend directly to said reduced portion 8 of the shank, while the slots in the inner nut 10 extend to the space 11. A locking device in the form of a metallic strip 14 is adapted to fit in any of the sets of alined slots, and thus bridge the joints between the nuts. This strip is preferably longer than the slots in which it fits and is provided at its inner end with a nib 15, arranged to pass through the slot of the inner nut 10 and enter in the space between said nut and the reduced portion 8 of the shank.

In using this structure the shank of the bolt is passed through the articles to be secured in the usual manner, and the nut 10 is screwed home upon the threaded portion 9. The nut 12 is then screwed upon the reduced portion 8 until it rests flat against the outer end of the nut 10 and the slots are in alinement. The key or fastening device 14 is thereupon driven into one of the sets of alined slots, and the nib 15, passing therethrough, will enter the space 11 and striking the reduced portion 8 will be offset, as illustrated in Fig. 3. The outer end of the key may then be bent over, as illustrated. Now it will be observed that as the nuts must move in opposite directions in order to be taken from the shank and as the key holds them against relative movement said nuts will be locked securely upon the shank, and, furthermore, that the key is also fastened in place. There is thus no danger of the nuts becoming loosened or disengaged from the shank by jars, vibrations, or any ordinary contingencies. If, however, it becomes necessary or desirable to remove the nuts, it is only necessary to apply a powerful wrench to the outer one and turn the same to the right, whereupon the key will be neatly cut in two, this being due to the fact that the outer edges of the slot-walls are made as sharp as possible in order that they may constitute cutting edges. As soon as the key has been thus severed the outer portion will turn readily with the outer nut and said outer nut may be removed, whereupon the inner nut may be also disengaged from the shank. A simple and secure lock is thus provided, which while perhaps particularly useful on railroads and similar places is applicable to machinery and articles of various sorts.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a nut-lock, the combination with a shank, having portions of different diameters threaded in opposite directions, of a nut screwed upon the larger portion, another nut screwed upon the smaller portion, said nuts having in their adjacent faces slots that are adapted to aline, said slots having their lines of direction intersecting the bolt, and a key arranged to be driven into the alined slots and having a longitudinally-projecting nib at its inner end and at one side, said nib being of less width than the key and being arranged to be passed through one of the slots and be upset against the bolt.

2. In a nut-lock, the combination with a shank having a larger inner portion threaded in one direction and a smaller outer portion threaded in an opposite direction, of a nut screwed upon the larger portion and projecting beyond the same, said projecting portion overlying the smaller portion of the shank and being spaced therefrom, another nut screwed upon the smaller portion of the shank, said nuts having alined slots in their adjacent ends, and a locking-key driven into the alined slot and having a nib at its inner end that is of less width than the key, is passed through the slot of the nut that is on the larger portion of the bolt, is abutted against the smaller portion of the shank and upset in the space between the same and the inner nut.

In testimony that I claim the foregoing as my own I have hereto affixed my signature in the presence of two witnesses.

EDWIN WALLACE STEVENS.

Witnesses:
E. L. DE PUE,
E. J. LITTLE.